Feb. 1, 1944.  F. R. DIETRICH  2,340,516
HEADLIGHT REFLECTOR
Filed March 24, 1941
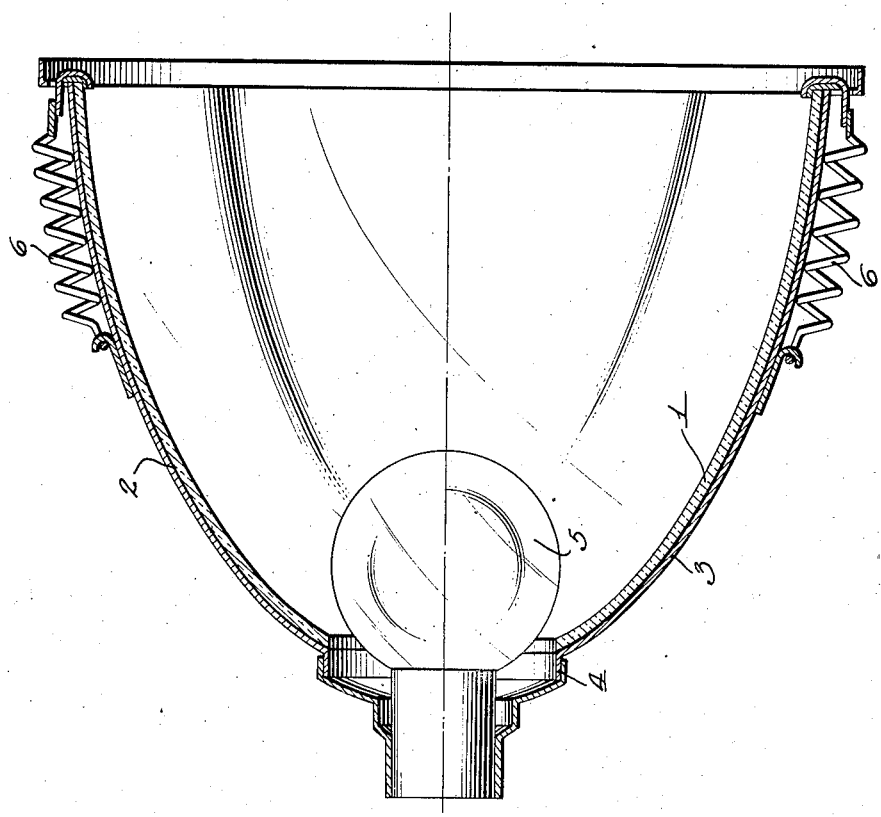
Inventor:
FRIEDRICH RICHARD DIETRICH
By Alm Holcombe
Attorney.

Patented Feb. 1, 1944

2,340,516

UNITED STATES PATENT OFFICE 2,340,516

HEADLIGHT REFLECTOR

Friedrich Richard Dietrich, Munich, Germany; vested in the Alien Property Custodian Application March 24, 1941, Serial No. 384,869
In Germany September 14, 1938

1 Claim. (Cl. 240—41.35)

Reflectors for headlights of tin-foiled hollow bodies of glass are known. The reflectors are blown in a mould and tin-foiled on the outside.

As the rays emanating from the source of light and falling on the tin-foil have to penetrate first the glass reflector, it is necessary to make the hollow body of glass as thin as possible so as to avoid aberrations. Nor must such a hollow body of glass possess any strengthened borders, ruffs, collars etc. such as e. g. for the reception of lamp sockets, as in this case irregularities would result on rather a large part of the surface.

Up to now it has not been possible to dispose hollow bodies of glass of such thinness in such a manner that the incandescent lamp of the lamp socket receives a rigid position prescribed in relation to the focus.

This is taken into account by the present invention by the hollow body of glass and the protective cover possessing at the sides facing each other surfaces of the same form adjoining in an exact fit, and by the protective cover being formed besides as a carrier for the lamp socket.

The attached drawing shows a form of execution of a reflector according to the invention in longitudinal section.

The hollow body of glass 1 possessing, e. g., an ellipsoidal shape is so formed as to have a thin wall, and is provided with a tin-foil 2 on the inner side.

The hollow body of glass 1 as well as the tin-foil 2 are housed in a protective cover 3 the inner side of which has the same form as the outer side of tin-foil 2. The hollow body of glass 1 with its tin-foil 2 thus adjoins in exact fit the inner side of the protective cover 3 and is consequently completely secured against breaking in case of any occurring shocks or the like.

The hollow body of glass 1 is conveniently pressed into the interior of the protective cover 3 by springs 6 and held in position in such a manner that any removal of the adjoining surfaces of the hollow body of glass 1 and of the protective cover 3 from one another is impossible.

The protective cover 3 possesses a cylindrical lengthening piece 4 representing the carrier for the incandescent lamp 5 or its socket.

By the hollow body of glass 1 and the protective cover 3 being rigidly and indisplaceably connected with one another due to their exact fit, it is warranted that on the one hand the incandescent lamp 5 always receives the position prescribed, e. g., with the filament of the lamp in the focus of the hollow body of glass, and on the other hand any change of position of the incandescent lamp 5 in relation to the hollow body of glass 1 is not possible.

What I claim is:

A headlight having an inner, comparatively thin walled, bowl shaped body which is formed of glass and in which a light source in the form of an electric bulb is to be positioned at the focal point of the glass bowl; an outer, stiff and rigid, bowl shaped body which is formed of metal and which intimately encases the glass bowl; reflecting means carried by the glass bowl comprising tin foil positioned on the outer surface of the glass bowl to cover substantially the entire area thereof; said glass bowl being nested in the metallic bowl with the inner surface of the metallic bowl being contiguous substantially throughout its entirety with the tin foiled surface of the glass bowl and tightly engaged with said tin foiled surface; the vertices of both bowls being provided with openings each of which is aligned with the longitudinal axis of its respective bowl; socket means provided on the metallic bowl comprising a tubular extension which projects rearwardly from the vertex opening in the metallic bowl in surrounding relation to the opening for supporting a light bulb within the interior of the glass bowl; and means for retaining the bowls in nested position comprising spring means having their rear ends secured to the outer portion of the metallic bowl and their front ends provided with hooks to engage the forward edges of the nested bowls and hold them tightly together.

FRIEDRICH RICHARD DIETRICH.